(12) United States Patent
Lee (10) Patent No.: US 8,908,132 B2
(45) Date of Patent: Dec. 9, 2014

(54) BLUE PHASE MODE LIQUID CRYSTAL DISPLAY DEVICE AND METHOD OF MANUFACTURING THE SAME

(75) Inventor: Sang-Wook Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 194 days.

(21) Appl. No.: 12/943,615

(22) Filed: Nov. 10, 2010

(65) Prior Publication Data

US 2011/0141415 A1    Jun. 16, 2011

(30) Foreign Application Priority Data

Dec. 11, 2009  (KR) .................. 10-2009-0123494

(51) Int. Cl.
- *G02F 1/1335* (2006.01)
- *G02F 1/139* (2006.01)
- *G02F 1/13363* (2006.01)
- *G02F 1/137* (2006.01)

(52) U.S. Cl.
CPC .... *G02F 1/1393* (2013.01); *G02F 2001/13793* (2013.01); *G02F 1/13363* (2013.01)
USPC ......................................... 349/118; 349/119

(58) Field of Classification Search
None
See application file for complete search history.

(56) References Cited

U.S. PATENT DOCUMENTS

| 7,283,189 | B2 * | 10/2007 | Jeon et al. ...................... 349/119 |
| 7,557,882 | B2 * | 7/2009 | Kobayashi et al. ............ 349/118 |
| 7,573,545 | B2 * | 8/2009 | Tu et al. ........................... 349/96 |
| 7,995,179 | B2 * | 8/2011 | Haruyama ..................... 349/133 |
| 2005/0140900 | A1 * | 6/2005 | Jeon et al. ..................... 349/141 |
| 2009/0161042 | A1 * | 6/2009 | Inoue et al. ..................... 349/96 |
| 2009/0231520 | A1 * | 9/2009 | Uchiyama et al. .............. 349/96 |
| 2010/0033663 | A1 * | 2/2010 | Miyachi et al. ............... 349/138 |

FOREIGN PATENT DOCUMENTS

| CN | 101103305 | 1/2008 |
| CN | 101395502 | 3/2009 |
| JP | 2009-104061 | 5/2009 |
| KR | 10-2005-0073221 | 7/2005 |
| WO | 2005059637 | 6/2005 |

OTHER PUBLICATIONS

"Polymer-Stabilized Liquid Crystalline Blue Phase for Display Applications"; H. Kikuchi Kyushu Univ Japan; Apr. 2, 2009.

\* cited by examiner

*Primary Examiner* — Richard Kim
(74) *Attorney, Agent, or Firm* — McKenna Long & Aldridge LLP (57) ABSTRACT

Disclosed is a liquid crystal display device that includes: a blue phase mode liquid crystal layer between the first and second substrates, and has an optical anisotropy when an electric field is applied and not applied; polarizing plates on outer surfaces of first and second substrates, respectively; and one of a first optical compensation film including a +C plate, and a second optical compensation film including a biaxial phase retardation layer, between the polarizing plate and the liquid crystal panel.

10 Claims, 5 Drawing Sheets

BLUE PHASE MODE LIQUID CRYSTAL DISPLAY DEVICE AND METHOD OF MANUFACTURING THE SAME

The present invention claims the benefit of Korean Patent Application No. 10-2009-0123494, filed in Korea on Dec. 11, 2009, which is hereby incorporated by reference for all purposes as if fully set forth herein.

BACKGROUND OF THE INVENTION

1. Field of the Invention

The present invention relates to a liquid crystal display device, and more particularly, to a blue phase mode liquid crystal display device and a method of manufacturing the same.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

The LCD device is categorized into a VA (vertical alignment) type LCD, IPS (in-plane switching) type LCD, and the like. The IPS type LCD device has advantage of wide viewing angles.

A nematic liquid crystal, a smetic liquid crystal, a cholesteric liquid crystal and the like are used as a liquid crystal of the LCD device. Among these liquid crystals, the nematic liquid crystal is widely used. However, response speed of the nematic liquid crystal is slow, and this causes degradation of display quality due to residual images.

To solve the problem, suggested is an LCD device using a blue phase mode liquid crystal, which is referred to as a blue phase mode LCD device. Optical property of the blue phase mode liquid crystal changes from isotropic property into anisotropic property by a voltage (i.e., an electric field) applied to the blue phase liquid crystal. Further, anisotropic refractive index is varied in proportion to the square of the applied voltage. Accordingly, response speed becomes fast.

The blue phase mode liquid crystal is operated by an in-plane electric field i.e., a horizontal electric field. However, when the blue phase mode LCD device displays a dark state (i.e., dark image), light leakage occurs and this causes reduction of contrast ratio.

Figure 1:
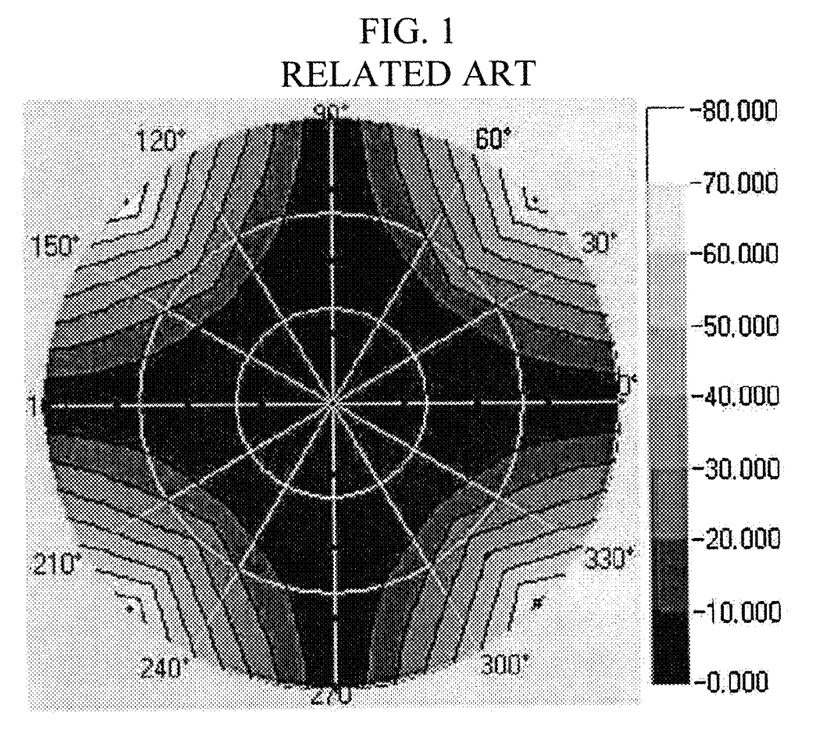
FIG. 1 shows simulation results of optical property of the related art blue phase mode LCD device in displaying dark state.

FIG. 1 shows simulation results of optical property of the related art blue phase mode LCD device in displaying dark state.

Referring to FIG. 1, in the dark state, light leakage is great at diagonal directions i.e., 45°, 135°, 225° and 315° directions, and brightness thus increases. Therefore, contrast ratio is reduced, and display quality is thus degraded.

SUMMARY OF THE INVENTION

Accordingly, the present invention is directed to a blue phase mode liquid crystal display device and a method of manufacturing the same which substantially obviates one or more of the problems due to limitations and disadvantages of the related art.

An advantage of the present invention is to provide a blue phase mode liquid crystal display device and a method of manufacturing the same that can improve display quality.

Additional features and advantages of the present invention will be set forth in the description which follows, and in part will be apparent from the description, or may be learned by practice of the invention. These and other advantages of the invention will be realized and attained by the structure particularly pointed out in the written description and claims thereof as well as the appended drawings.

To achieve these and other advantages and in accordance with the purpose of the present invention, as embodied and broadly described herein, a liquid crystal display device includes: a liquid crystal panel that includes first and second substrates facing each other, and a blue phase mode liquid crystal layer that is between the first and second substrates, and that has an optical anisotropy when an electric field is applied and has an optical isotropy when an electric field is not applied; polarizing plates that are on outer surfaces of the first and second substrates, respectively; and one of a first optical compensation film including a +C plate, and a second optical compensation film including a biaxial phase retardation layer, between the polarizing plate and the liquid crystal panel, wherein the +C plate has a relation of refractive indexes that is (nx=ny<nz), wherein the biaxial phase retardation layer has a relation of refractive indexes that is (nx>ny>nz), and wherein the nx and ny of each of the +C plate and the biaxial phase retardation layer are refractive indexes in X and Y directions, respectively, in a XY plane, and the nz of each of the +C plate and the biaxial phase retardation layer is a refractive index in a normal direction to the XY plane.

In another aspect, a method of manufacturing a liquid crystal display device includes: forming a liquid crystal panel that includes first and second substrates facing each other, and a blue phase mode liquid crystal layer that is between the first and second substrates, and that has an optical anisotropy when an electric field is applied and has an optical isotropy when an electric field is not applied; forming polarizing plates that are on outer surfaces of the first and second substrates, respectively; and forming one of a first optical compensation film including a +C plate, and a second optical compensation film including a biaxial phase retardation layer, between the polarizing plate and the liquid crystal panel, wherein the +C plate has a relation of refractive indexes that is (nx=ny<nz), wherein the biaxial phase retardation layer has a relation of refractive indexes that is (nx>ny>nz), and wherein the nx and ny of each of the +C plate and the biaxial phase retardation layer are refractive indexes in X and Y directions, respectively, in a XY plane, and the nz of each of the +C plate and the biaxial phase retardation layer is a refractive index in a normal direction to the XY plane.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

An LCD device according to the present invention uses a blue phase mode liquid crystal, which may have an optically isotropic state when an electric field is not applied and an optically anisotropic state when an electric field is applied.

Figure 2:
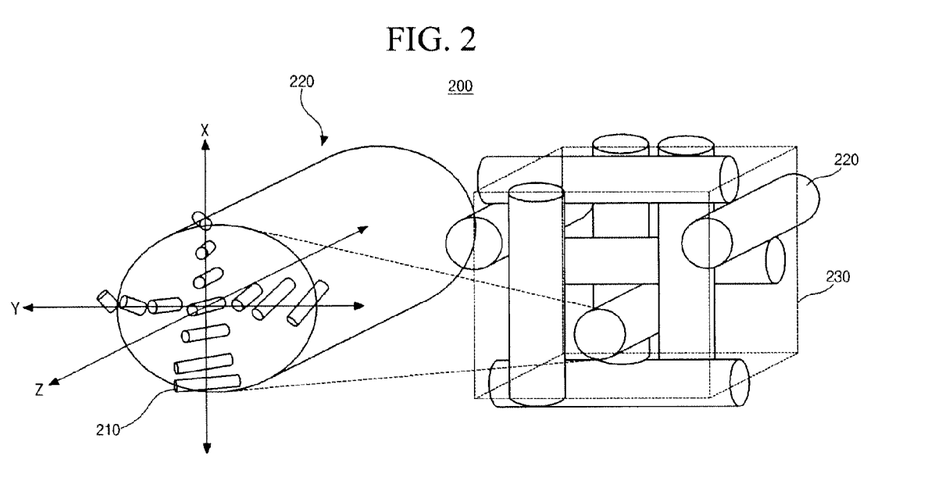
FIG. 2 is a view illustrating a structure of a blue phase mode liquid crystal used in the LCD device according to the present invention.

FIG. 2 is a view illustrating a structure of a blue phase mode liquid crystal used in the LCD device according to the present invention.

Referring to FIG. 2, a blue phase mode liquid crystal layer 200 includes a plurality of double twist cylinders (DTCs) 220 arranged in a cubic lattice 230. Each of the plurality of DTCs 220 includes liquid crystal molecules 210 arranged along two axes (X and Y axes) perpendicular to an axis (Z axis) of a cylinder with a twist angle. The outer liquid crystal molecules with respect to the Z axis are twisted with a larger twist angle. Accordingly, the liquid crystal molecules 210 in each of the plurality of DTCs 220 have a directional property with respect to the axis (Z axis) of the cylinder.

The blue phase of the liquid crystal molecules 210 is obtained under a temperature range between a chiral nematic phase and an isotropic phase. For example, the blue phase may be obtained under a narrow temperature range of about 1~2° C. Accordingly, an exact temperature control is required to obtain the blue phase of the liquid crystal molecules 210.

To enlarge the temperature range for the blue phase, the cubic lattice 230 of the plurality of DTCs 220 of the blue phase may be stabilized by a polymer. When the polymer is mixed with the liquid crystal molecules 210, the polymer is combined with the liquid crystal molecules 210 having no directional property rather than the liquid crystal molecules 210 having the directional property in the plurality of DTCs 220. As a result, the cubic lattice 230 of the plurality of DTCs 220 is stabilized and the temperature range for the blue phase is enlarged to about 0~50° C.

For example, the liquid crystal molecules 210 stabilized by a polymer may include one of the following three materials.

(I)

(II)

(III)

In addition, the liquid crystal molecules 210 stabilized by a polymer may include 4-cyano-4'-pentylbiphenyl or a composition of above four materials.

The liquid crystal molecules 210 stabilized by a polymer may include a monomer, a photoinitiator and a polymer such as a binder. The polymer stabilizes the liquid crystal molecules 210 and enlarges the temperature range for a blue phase to about 0~50° C. The monomer includes a photopolymerizable compound having a carbon-to-carbon unsaturated bond and a carbon-to-carbon ring-shaped bond. For example, the monomer may include an acrylic compound such as 1,3-butyleneglicoldiacrylate, 1,4-butanedioldiacrylate and ethyleneglycoldiacrylate. The photoinitiator is an initiator for photo-polymerization and includes at least one acetophenone compound. For example, the photoinitiator may include diethoxyacetophenone, 2-methyl-2-monopolyno-1-(4-methylthiophenyl)propane-1-one, 2-hydroxy-2-methyl-1-phenylpropane-1-one. In addition, the photoinitiator may include a benzoin compound, a benzophenone compound, a thioxanthone compound and a triazine compound. For example, the benzoin compound may include benzoin, benzoinmethylether and benzomethylether. The thioxanthone compound may include 2-isopropylthioxanthone, 4-isopropylthioxanthone and 2,4-diethylthioxantone, and the triazine compound may include 2,4-trichloromethyl-(piperonyl)-6-triazine, 2,4-bis(trichloromethyl)-6-(4-methoxynaphthyl)-1,3,5-triazine.

The binder includes an acrylic co-polymer having a co-polymer of a carboxylic monomer and the other monomer co-polymerizable with the carboxylic monomer. For example, the carboxylic monomer may be an unsaturated carboxylic acid and the unsaturated carboxylic acid may include an acrylic acid, a methacrylic acid and a crotonic acid. The monomer co-polymerizable with the carboxylic monomer may include styrene, α-methylstyrene, o-vinyltoluene.

When an electric field is not applied to the liquid crystal molecules 210 stabilized by a polymer, the liquid crystal molecules 210 are randomly aligned. In addition, when an electric field is applied to the liquid crystal molecules 210 stabilized by a polymer, the liquid crystal molecules 210 are aligned along the electric field. As a result, the blue phase mode liquid crystal layer 200 of an isotropic polar material has a refractive index proportional to a square of a driving voltage, which is referred to as a Kerr effect, and a response speed of the blue phase mode LCD device is improved due to the Kerr effect.

The refractive index of the blue phase mode liquid crystal layer 200 is determined according to regions where an electric field is generated. Accordingly, when an electric field is uniformly generated, uniformity in brightness is obtained and display property of the blue phase mode LCD device is improved. Further, since an alignment step for the blue phase liquid crystal layer 200 is not required, an orientation film and a rubbing step are omitted.

Therefore, when the blue phase mode liquid crystal molecules 210 stabilized by a monomer is used for the liquid crystal layer 200, the liquid crystal layer 200 is dynamically rotated according to an electric field and a response time of the blue phase mode LCD device is reduced. In addition, a display property of the blue phase mode LCD device is improved and an efficiency of fabrication is improved due to omission of an orientation film and a rubbing step.

Figure 3A:
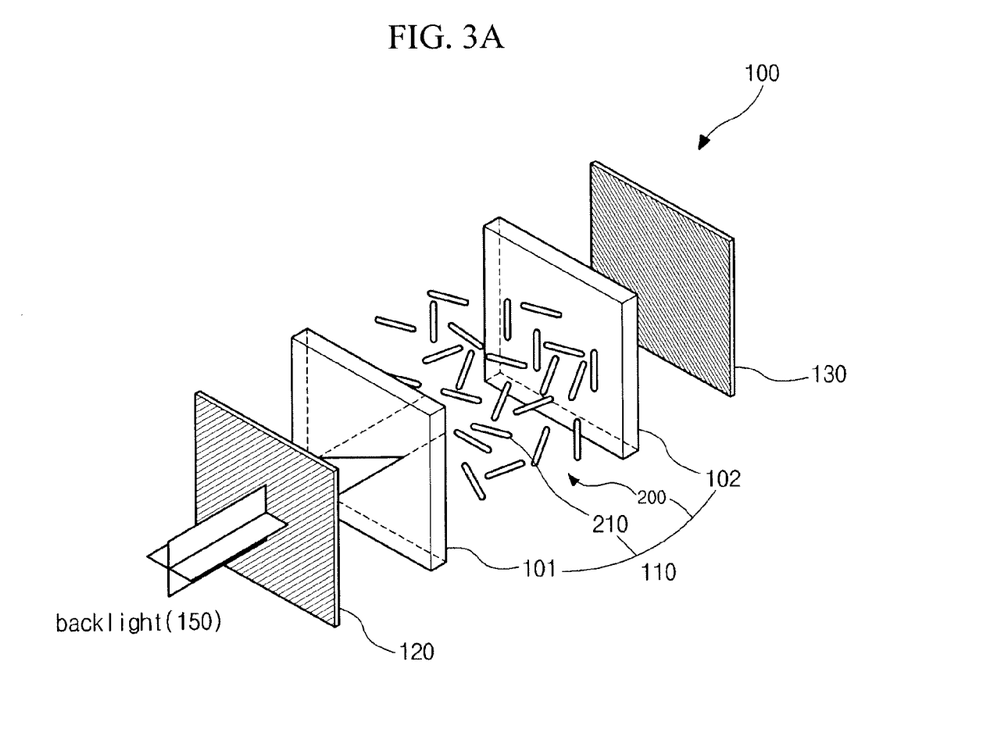
FIGS. 3A and 3B are views illustrating optical property of the LCD device according to the present invention.
Figure 3B:
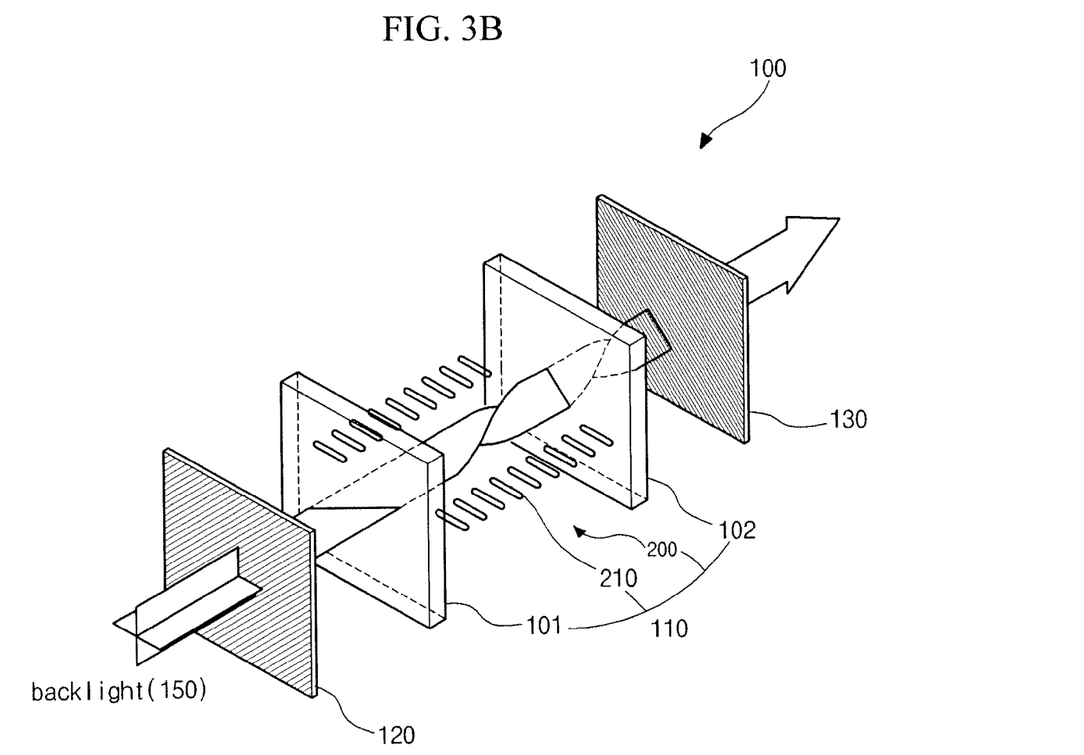

FIGS. 3A and 3B are views illustrating optical property of the LCD device according to the present invention.

Referring to FIGS. 3A and 3B, the blue phase mode LCD device 100 includes a liquid crystal panel 110 and a backlight 150 supplying light to the liquid crystal panel 110. The liquid crystal panel 110 includes first and second substrates 101 and 102, and a blue phase mode liquid crystal layer 200 between the first and second substrates 101 and 102. The backlight 150 may supply scattered light that is close to natural light.

First and second polarizing plates 120 and 130 are on outer surfaces of the first and second substrates 101 and 102, respectively.

The liquid crystal molecules 210 of the blue phase mode liquid crystal layer 200 are aligned along an electric field (i.e., a horizontal electric field) that is substantially in parallel with the surfaces of the first and second substrates 101 and 102. Accordingly, to obtain maximum brightness, it is preferred that polarization axes (i.e., a transmission axes) of the first and second polarizing plates 120 and 130 are perpendicular to each other. Further, it is preferred that the polarization axes of the first and second polarizing plates 120 and 130 make an angle of 45° with the horizontal electric field produced in the liquid crystal panel 110.

Referring to FIG. 3A, in off-voltage state (i.e., when not applying an electric field), among lights emitted from the backlight 150, lights in parallel with the polarization axis of the first polarizing plate 120 passes through the first polarizing plate 120. However, the DTSs (220 of FIG. 2) are arranged to form a sphere shape in the off-voltage state, and the blue phase mode liquid crystal is in isotropic state (i.e., nx=ny, where the nx and ny are refractive indexes in X and Y directions, respectively). Accordingly, the lights passing through the first polarizing plate 120 do not pass through the liquid crystal layer 200. Therefore, the LCD device 100 displays dark state, for example, black.

Referring to FIG. 3B, in on-voltage state (i.e., when applying an electric field), the structure of the lattice (230 of FIG. 2) is deformed, and a double refraction in a specific direction is thus produced. In other words, the blue phase mode liquid crystal is in anisotropic state (i.e., nx≠ny). Accordingly, among the lights passing through the first polarizing plate 120, lights in parallel with the liquid crystal molecules 200 passes through the liquid crystal layer 200. Then, among the lights passing through the liquid crystal layer 200, lights in parallel with the polarization axis of the second polarizing plate 130 passes through the second polarizing plate 130. Therefore, the LCD device 100 displays bright state, for example, white.

As such, when the electric field is applied to the liquid crystal layer 200, the symmetrical structure of the lattice (230 of FIG. 2) is deformed, and the double refraction is realized. Accordingly, white is effectively displayed.

A direction, in which the double refraction takes place, is specific, and a magnitude of the double refraction varies according to the applied electric field.

Viewing angle property of the LCD device 100 can be improved by employing an optical compensation film, which is explained in more detail with reference to following embodiments.

Figure 4:
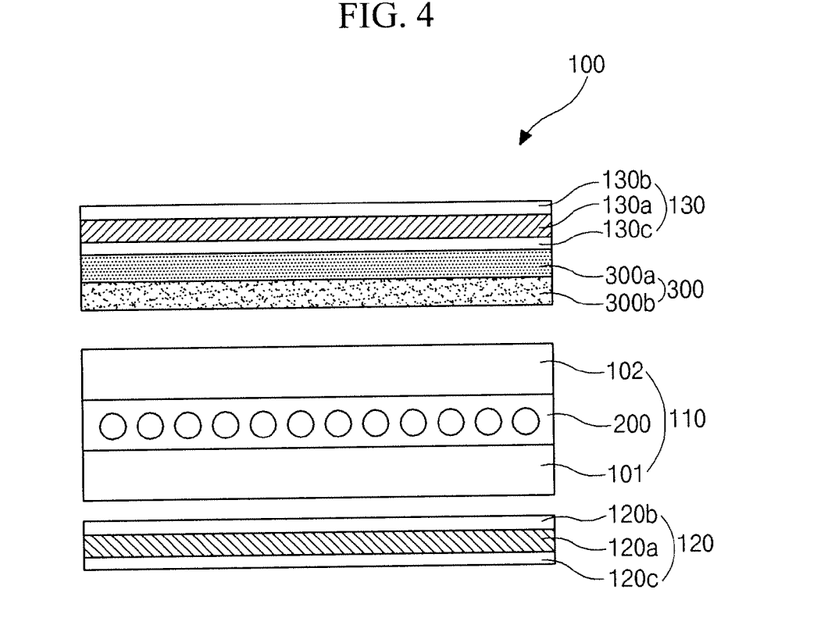
FIG. 4 is a schematic view illustrating an LCD device according to a first embodiment of the present invention.

FIG. 4 is a schematic view illustrating an LCD device according to a first embodiment of the present invention.

Referring to FIG. 4, the LCD device 100 includes a liquid crystal panel 110 that includes first and second substrates 101 and 102 facing each other, and a blue phase mode liquid crystal layer 200 between the first and second substrates 101 and 102.

Although not shown in the drawings, the first substrate 101 may include gate and data lines to define a pixel region. In the pixel region, a thin film transistor connected to the gate and data lines. The thin film transistor includes a gate electrode, a gate insulating layer, a semiconductor layer, and source and drain electrodes. A common electrode, and a pixel electrode connected to the thin film transistor are formed in the pixel region. The common and pixel electrodes produce a horizontal electric field. For example, the pixel and common electrodes may be alternately arranged in the pixel region to form the horizontal electric field. The first substrate 101 may be referred to as an array substrate.

The second substrate 102 may include a black matrix, and a color filter layer. The black matrix includes an opening corresponding to the pixel region, and the color filter layer is formed corresponding to the opening of the black matrix. The second substrate may be referred to as a color filter substrate.

First and second polarizing plates 120 and 130 may be on outer surfaces of the first and second substrates 101 and 102, respectively. Further, an optical compensation film 300 may be between the second polarizing plate 130 and the liquid crystal panel 110.

The first and second polarizing plates 120 and 130 include polarizing layers 120a and 130a, first base films 120b and 130b, and second base films 120c and 130c, respectively. The polarizing layers 120a and 130a have polarization axes, respectively. The polarizing layers 120a and 130a are between the corresponding first and second base films 120b and 120c, and 130b and 130c. The first and second base films 120b and 120c, and 130b and 130c may function to protect and support the corresponding polarizing layers 120a and 130a.

Each of the first and second polarizing plates 120 and 130 have the polarization axis and each transmit light in parallel with the polarization axis. This property is realized by stretching polyvinylalcohol (PVA), which absorbs iodine as polarizer, with strong tensile force to fabricate the polarizing plates 120 and 130.

Each of the first and second polarizing plates 120 and 130 may be triacetyl cellulose (TAC) film. Alternatively, Each of the first and second polarizing plates 120 and 130 may be made of one selected from a group that includes, but not limited to, polyethylene terephthalate polymer, polyethylene naphtalate polymer, polyester polymer, polyethylene polymer, polypropylene polymer, polyvinylidene chloride polymer, polyvinyl alcohol polymer, polyethylene vinyl alcohol polymer, polystyrene polymer, polycarbonate polymer, norbornene polymer, poly methyl pentene polymer, polyether ketone polymer, polyether sulfone polymer, polysulfone polymer, polyether ketone imide polymer, polyamide polymer, polymethacrylate polymer, polyacrylate polymer, and fluoropolymer.

A surface-treated layer (not shown) may be formed on a surface of the second base film 130b of the second polarizing plate 130. The surface-treated layer may be an anti-glare layer that includes silica bead, a hard coating layer that functions to protect surface damage of the second polarizing plate 130, or a sticking layer that functions to prevent sticking on an adjacent layer.

The optical compensation film 300 may include a +C plate 300a and a +A plate 300b. The optical compensation film 300 may substantially make all types of compensation for phase retardation, which the LCD device 100 needs. This is explained in more detail as follows.

The +C plate 300a and the +A plate 300b each have refractive indexes nx, ny and nz in X, Y and Z directions, respectively, with respect to a space coordinate system. In other words, the nx and ny indicate the refractive indexes in the X and Y directions, respectively, on a XY plane of each of the plates 300a and 300b, and the nz indicates the refractive index in a normal direction (i.e., Z direction) that is perpendicular to the XY plane of each of the plates 300a and 300b.

The relation of the refractive indexes is expressed as follows: (nx>ny=nz) for the +A plate 300b; and (nx=ny<nz) for the +C plate 300a. Accordingly, the +C plate 300a and the +A plate 300b each function to refract light incident thereon according to the refractive indexes thereof.

An in-plane phase retardation value of the +A plate 300b may be defined with a difference between the two refractive indexes in plane and a thickness of the optical compensation film 300. The in-plane phase retardation value means a phase retardation value in the XY plane. For example, the in-plane phase retardation value of the +A plate 300b is expressed as a following first formula (1): Rin=d×(nx−ny) (where d is the thickness of the optical compensation film 300).

Accordingly, the +A plate 300b changes an axis of direction of light into the X axis. It is preferred that the in-plane phase retardation value of the +A plate 300b is about −50 nm to about −300 nm at a wavelength of about 550 nm.

An in-thickness phase retardation value of the +C plate 300a may be defined with a difference between the refractive index in plane and the refractive index in the normal direction, and a thickness of the optical compensation film 300. The in-thicknesses phase retardation value means a phase retardation value in the thickness direction (i.e., in the normal direction). For example, the in-thickness phase retardation value of the +C plate 300a is expressed as a following second formula (2): Rth=d×(nz−ny) (where d is the thickness of the optical compensation film 300).

An in-plane phase retardation value of the +C plate 300a is substantially close to 0 (zero), and the in-thickness phase retardation value of the +C plate 300a is substantially positive. Accordingly, the +C plate 300a makes light directed into the Z axis. It is preferred that the in-thickness phase retardation value of the +C plate 300a is about 50 nm to about 500 nm at a wavelength of about 550 nm.

By employing the +A plate 300b and the +C plate 300a, light is refracted in the X axis and the Z axis. Accordingly, light leakage and reduction of contrast ratio can be prevented.

The first and second polarizing plates 120 and 130 effects compensation for a residual phase retardation value through the first and second base films 120b and 120c, and 130b and 130c.

Generally, the base films 120b, 120c, 130b and 130c have an in-plane phase retardation value of about 2 nm to about 5 nm, and an in-thickness phase retardation value of about −40 nm to −55 nm.

By the phase retardation values of the base films 120b, 120c, 130b and 130c and the phase retardation values of the optical compensation film 300, the residual phase retardation value of the blue phase mode liquid crystal layer 200 can be compensated for, and light leakage can be prevented.

By adjusting the phase retardation values of the base films 120b, 120c, 130b and 130c, effect of compensation for the residual phase retardation value may be greater. For example, by adjusting stretching condition for the base films 120b, 120c, 130b and 130c, the in-plane phase retardation value and/or the in-thickness phase retardation value of the base films 120b, 120c, 130b and 130c may be adjusted.

Accordingly, in dark state, the residual phase retardation value of the liquid crystal layer 200 can be compensated for, and light leakage can be prevented.

Figure 5:
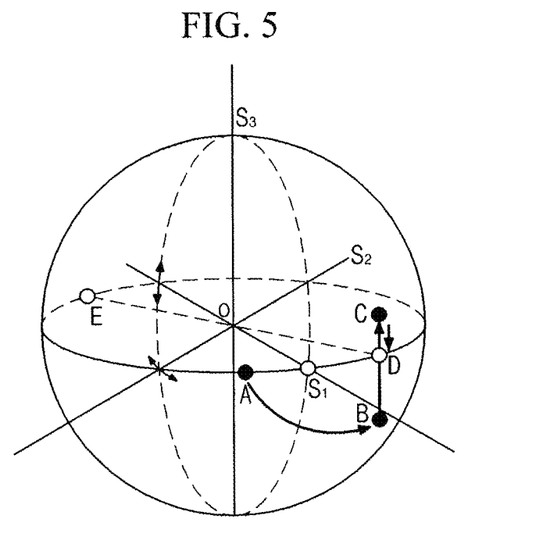
FIG. 5 is a view illustrating a poincare sphere showing polarization states of light passing through optical elements of the LCD device according to the first embodiment of the present invention.

FIG. 5 is a view illustrating a poincare sphere showing polarization states of light passing through optical elements of the LCD device according to the first embodiment of the present invention.

Polarization states of light are expressed on the surface of the poincare sphere. When an optical axis and a phase retardation value of an optical element are known, polarization state is easily predicted using the poincare sphere. Accordingly, the poincare sphere is widely used in designing an optical compensation film.

The equator of the poincare sphere indicates a linear polarization, a pole $S_3$ (i.e., a north pole) indicates a left-handed circular polarization, and an opposite pole $-S_3$ (i.e., a south pole) indicates a right-handed circular polarization. An upper hemisphere (i.e., a northern hemisphere) indicates a left-handed elliptical polarization, and a lower hemisphere (i.e., a southern hemisphere) indicates a right-handed elliptical polarization.

Referring to FIG. 5, when the LCD device is seen in front thereof, a point $S_1$ indicates a polarization state of the first polarizing plate (120 of FIG. 4), and a point $-S_1$ indicates a polarization state of the second polarizing plate (130 of FIG. 4). The polarization states of the first and second polarizing plates are symmetrical with respect to a center O of the poincare sphere, and are perpendicular to each other. Accordingly, a good dart state is displayed.

However, when the LCD device is seen in oblique direction, the polarization state of the first polarizing plate moves to a point A, and the polarization state of the second polarizing plate moves to a point E. The point A and the point E are not symmetrical with respect to the center O, and thus the polarization states of the first and second polarizing plates 120 and 130 are not perpendicular.

Accordingly, by using the optical compensation film (300 of FIG. 4), the polarization state of light, which reaches the second polarizing layer (130a of FIG. 4) of the second polarizing plate 130, is made to be perpendicular to the polarization state of the first polarizing layer (120a of FIG. 4) of the first polarizing plate.

For example, when the LCD device is seen in oblique direction, an axis of direction of light, which passes through the +A plate (300b of FIG. 4), changes into the X axis. Accordingly, by passing through the +A plate, polarization state of light moves from a point A into a point B.

The +C plate (300a of FIG. 4) changes an axis of direction of light into the Z axis. Accordingly, by passing through the +C plate, polarization state of light moves from the point B into a point C.

Through the first and second base films (130b and 130c of FIG. 4) of the second polarizing plate having the phase retardation values as described above, polarizing state of light moves from the point C to a point D.

Since phase retardations of the +A plate and the +C plate vary according to wavelengths, extent of rotation on the surface of the poincare sphere may vary. Accordingly, there may be variation in reaching the point D.

The point D obtained through the optical compensation film is symmetrical to the point E with respect to the center O. Accordingly, the polarization state (represented by the point D) of light, which reaches the second polarizing layer of the second polarizing plate, is substantially perpendicular to the polarization state (represented by the point E) of the first polarizing plate. Therefore, the second polarizing plate blocks the light, and thus dark state can be displayed well.

As described above, in the first embodiment, the optical compensation film including the +A plate and the +C plate is employed to adjust the polarization state of light. Therefore, light leakage and reduction of contrast ratio can be prevented.

In the first embodiment, the LCD device may include another A+ plate which has an in-plane phase retardation value of about −25 nm to about −150 nm at a wavelength of about 550 nm, and is between the first polarizing plate (120 of FIG. 4) and the liquid crystal panel (110 of FIG. 4), and the +A plate (300b of FIG. 4) of the optical compensation film (300 of FIG. 4) may have an in-plane phase retardation value of about −25 nm to about −150 nm at a wavelength of about 550 nm.

Alternatively, the first and second base films (120b and 120c of FIG. 4) of the first polarizing plate (120 of FIG. 4) may not have to have a phase retardation value, and the +A plate (300b of FIG. 4) and the +C plate (300a of FIG. 4) of the optical compensation film (300 of FIG. 4) may change positions thereof.

Figure 6:
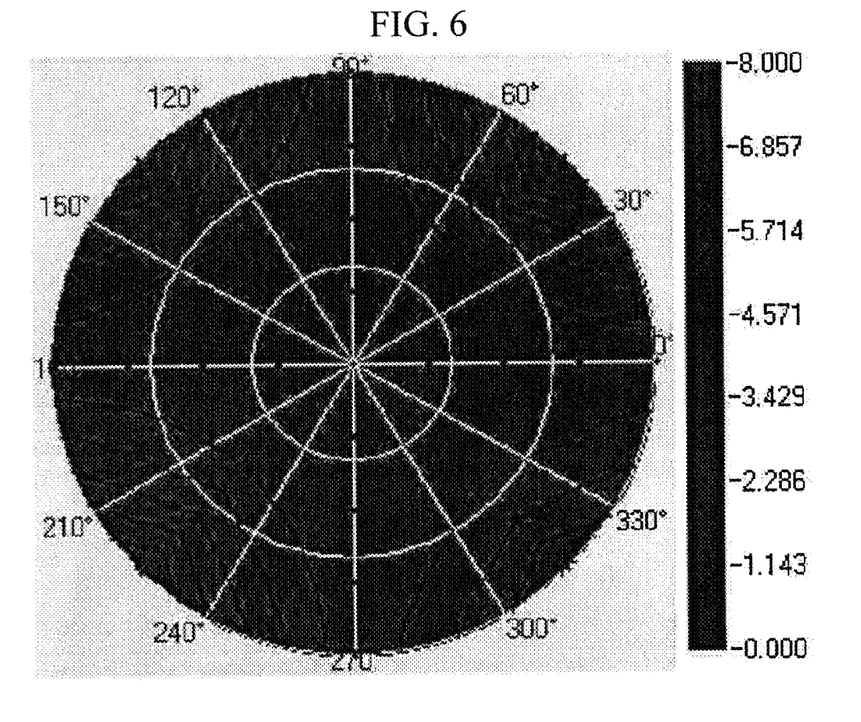
FIG. 6 shows simulation results of optical property of the LCD device in displaying dark state according to the first embodiment of the present invention.

FIG. 6 shows simulation results of optical property of the LCD device in displaying dark state according to the first embodiment of the present invention.

Referring to FIG. 6, in the dark state, light leakage is reduced at diagonal directions i.e., 45°, 135°, 225° and 315° directions much more than the related art. Therefore, reduction of contrast ratio can be reduced, and display quality can be thus improved.

In FIG. 4, shown is the example that the optical compensation film 300 is between the second substrate 102 and the second polarizing plate 130. Alternatively, the optical compensation film 300 may be configured between the first substrate 101 and the first polarizing plate 120.

When the base films 120b, 120c, 130b and 130c is made of a material, which is other than a material generally used for the base films 120b, 120c, 130b and 130c, for example, a material having a small phase retardation value, not only the optical compensation film 300 between the second substrate 102 and the second polarizing plate 130 but also another optical compensation film consisting of a +A plate between the first substrate 101 and the first polarizing plate 120 may be employed, or optical compensation films each consisting of a +C plate may be configured between the first substrate 101 and the first polarizing plate 120 and between the second substrate 102 and the second polarizing plate 130.

Figure 7:
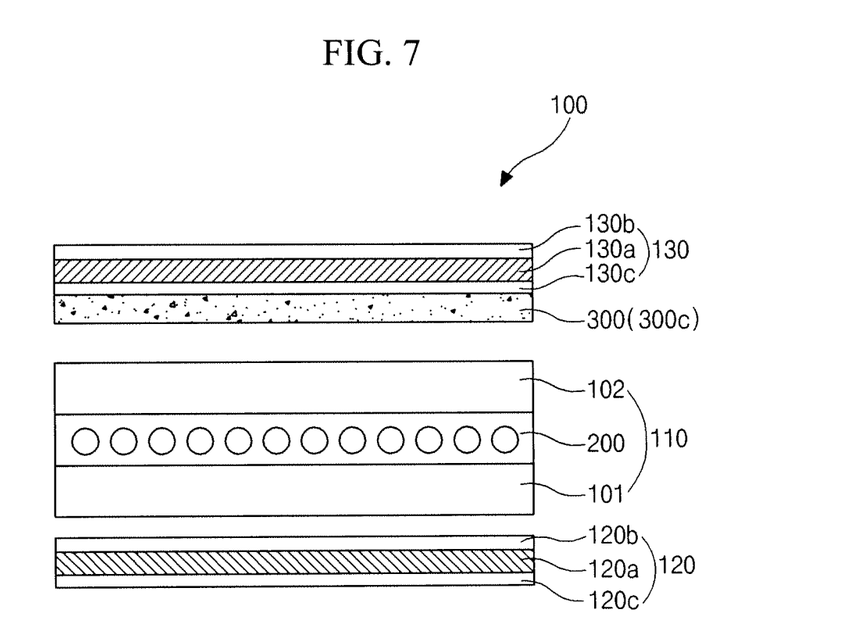
FIG. 7 is a schematic view illustrating an LCD device according to a second embodiment of the present invention.

FIG. 7 is a schematic view illustrating an LCD device according to a second embodiment of the present invention. The LCD device is similar to that of the first embodiment. Accordingly, explanations of parts similar to parts of the first embodiment may be omitted.

Referring to FIG. 7, the LCD device 100 includes a liquid crystal panel 110 that includes first and second substrates 101 and 102, and a blue phase mode liquid crystal layer 200 between the first and second substrates 101 and 102.

First and second polarizing plates 120 and 130 are located on outer surfaces of the first and second substrates 101 and 102, respectively. Further, an optical compensation film 300 is located between the second polarizing plate 130 and the liquid crystal panel 200.

The first and second polarizing plates 120 and 130 include polarizing layers 120a and 130a, first base films 120b and 130b, and second base films 120c and 130c, respectively. The polarizing layers 120a and 130a have polarization axes, respectively. The polarizing layers 120a and 130a are between the corresponding first and second base films 120b and 120c, and 130b and 130c. The first and second base films 120b and 120c, and 130b and 130c may function to protect and support the corresponding polarizing layers 120a and 130a.

The optical compensation film 300 may include a biaxial phase retardation layer 300c. The biaxial phase retardation layer 300c has refractive indexes nx, ny and nz with respect to a space coordinate system. The relation of the refractive indexes is expressed as follows: (nx>ny>nz).

The biaxial phase retardation layer 300c has both of an in-plane phase retardation value and an in-thickness phase retardation value that are expressed as a following formula (3): Rin=d×(nx−ny); and Rth=d×{(nz+ny)/2−nz} (where d is the thickness of the optical compensation film 300).

It is preferred that the in-plane phase retardation value Rin is about 20 nm to about 200 nm at a wavelength of about 550 nm, and the in-thickness phase retardation value Rth is about −50 nm to about −300 nm at a wavelength of about 550 nm.

By adjusting the polarization state using the biaxial phase retardation layer 300c, light leakage and reduction of contrast ratio can be prevented.

Alternatively to the configuration shown in FIG. 7, the biaxial phase retardation layer 300c may be configured between the first polarizing plate 120 and the liquid crystal panel 110.

Alternatively, a +A plate (300b of FIG. 4), which has an in-plane phase retardation value of about −25 nm to about −150 nm at a wavelength of about 550 nm, may be further configured between the first polarizing plate 120 and the liquid crystal panel 110, and the base films 120b, 120c, 130b and 130c may have an in-plane phase retardation value of about 2 nm to about 5 nm, and an in-thickness phase retardation value of about −40 nm to −55 nm.

Alternatively, the base films 120b, 120c, 130b and 130c may not have a phase retardation value, and a +C plate (300a of FIG. 4), which has an in-thickness phase retardation value of about 50 nm to about 500 nm at a wavelength of about 550 nm, may be further configured between the biaxial phase retardation layer 300c and the liquid crystal panel 110.

Alternatively, the biaxial phase retardation layer 300c and the +C plate (300a of FIG. 4) may be configured between the first polarizing plate 120 and the liquid crystal panel 110. In this case, the base films 120b, 120c, 130b and 130c may not have to have a phase retardation value.

As described in the above embodiments, employed may be various configurations using at least one optical compensation films, for example, at least one of an optical compensation film including at least one of the +C plate 300a and the +A plate 300b, and an optical compensation film including the biaxial phase retardation layer 300c. For example, the biaxial phase retardation layer 300c may be between the second substrate 102 and the second polarizing plate 130, and the +A plate 300b may be between the first substrate 101 and the first polarizing plate 120. Or, the biaxial phase retardation layer 300c and the +C plate 300a may be sequentially placed between the second substrate 102 and the second polarizing plate 130. Or, the +C plate 300a and the biaxial phase retardation layer 300c may be sequentially placed between the first substrate 101 and the first polarizing plate 120. However, it should be understood that configurations other than the above-described configurations may be employed.

The LCD device according to the embodiments of the present invention employs at least one the optical compensation film. Accordingly, in the dart state, light leakage at the diagonal directions can be reduced, contrast ratio can be improved, and color inversion according to viewing angles can be reduced. Therefore, display quality can be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a liquid crystal panel that includes first and second substrates facing each other, and a blue phase mode liquid crystal layer that is between the first and second substrates, and that has an optical anisotropy when a horizontal electric field is applied and has an optical isotropy when a horizontal electric field is not applied, wherein the first substrate is closer to a backlight unit than the second substrate;
polarizing plates that are on outer surfaces of the first and second substrates, respectively; and
an optical compensation film including a biaxial phase retardation layer that is located between the polarizing plate on the outer surface of the second substrate and directly above the second substrate,
wherein no +C plate is located between the polarizing plate on the outer surface of the second substrate and the second substrate,
wherein the biaxial phase retardation layer has a relation of refractive indexes that is (nx>ny >nz),
wherein the nx and ny of the biaxial phase retardation layer are refractive indexes in X and Y directions, respectively, in a XY plane, and the nz of the biaxial phase retardation layer is a refractive index in a normal direction to the XY plane,
wherein polarization axes of the polarizing plates make an angle of 45° with the horizontal electric field produced in the liquid crystal panel, and
wherein an +A plate has a relation of refractive indexes that is (nx>ny=nz) and is arranged between the first polarizing plate and the first substrate of the liquid crystal panel.

2. The device according to claim 1, wherein an in-plane phase retardation value of the biaxial phase retardation layer is about 20 nm to about 200 nm at a wavelength of about 550 nm, an in-thickness phase retardation value of the biaxial phase retardation layer is about −50 nm to about −300 nm at a wavelength of about 550 nm.

3. The device according to claim 1, wherein an in-plane phase retardation value of the +A plate is about −25 nm to −150 nm at a wavelength of about 550 nm.

4. The device according to claim 1, wherein the polarizing plate includes first and second base films, and a polarizing layer between the first and second base films.

5. The device according to claim 4, wherein the first and second base films have an in-plane phase retardation value of about 2 nm to about 5 nm, and an in-thickness phase retardation value of about −40 nm to about −55 nm.

6. A method of manufacturing a liquid crystal display device, comprising:
forming a liquid crystal panel that includes first and second substrates facing each other, and a blue phase mode liquid crystal layer that is between the first and second substrates, and that has an optical anisotropy when a horizontal electric field is applied and has an optical isotropy when a horizontal electric field is not applied, wherein the first substrate is closer to a backlight unit than the second substrate;
forming polarizing plates that are on outer surfaces of the first and second substrates, respectively; and
forming an optical compensation film including a biaxial phase retardation layer that is located between the polarizing plate on the outer surface of the second substrate and directly above the second substrate,
wherein no +C plate is located between the polarizing plate on the outer surface of the second substrate and the second substrate,
wherein the biaxial phase retardation layer has a relation of refractive indexes that is (nx>ny>nz),
wherein the nx and ny of the biaxial phase retardation layer are refractive indexes in X and Y directions, respectively, in a XY plane, and the nz of the biaxial phase retardation layer is a refractive index in a normal direction to the XY plane,
wherein polarization axes of the polarizing plates make an angle of 45° with the horizontal electric field produced in the liquid crystal panel, and
wherein an +A plate has a relation of refractive indexes that is (nx>ny=nz) and is arranged between the first polarizing plate and the first substrate of the liquid crystal panel.

7. The method according to claim 6, wherein an in-plane phase retardation value of the biaxial phase retardation layer is about 20 nm to about 200 nm at a wavelength of about 550 nm, an in-thickness phase retardation value of the biaxial phase retardation layer is about −50 nm to about −300 nm at a wavelength of about 550 nm.

8. The method according to claim 6, wherein an in-plane phase retardation value of the +A plate is about −25 nm to −150 nm at a wavelength of about 550 nm.

9. The method according to claim 6, wherein the polarizing plate includes first and second base films, and a polarizing layer between the first and second base films.

10. The method according to claim 9, wherein the first and second base films have an in-plane phase retardation value of about 2 nm to about 5 nm, and an in-thickness phase retardation value of about −40 nm to about −55 nm.

* * * * *